March 24, 1936.                C. E. REED                2,035,342
                             TAILOR'S APPLIANCE
                            Filed Nov. 12, 1934
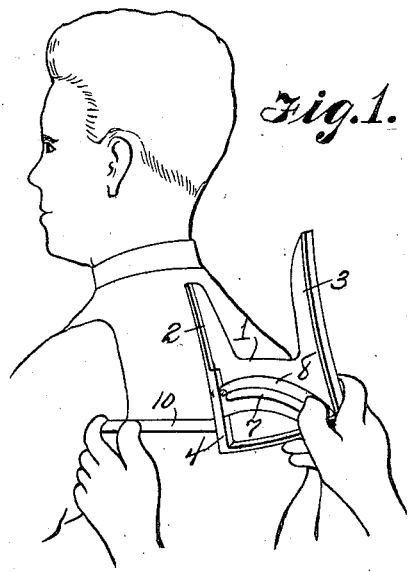
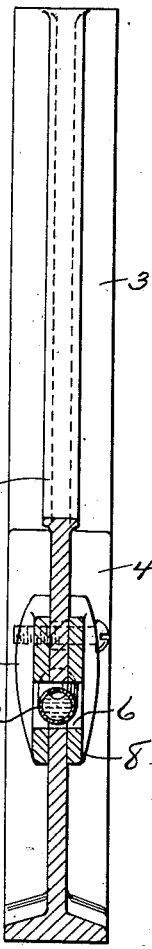
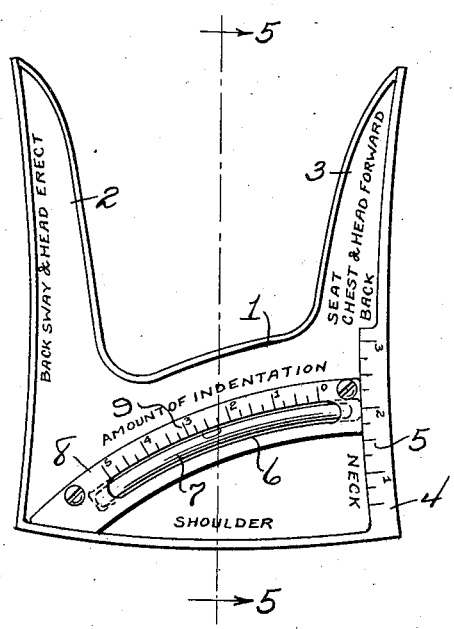
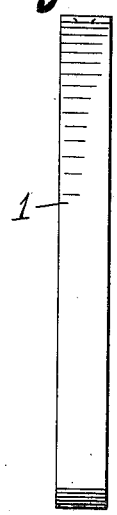
Charles E. Reed
INVENTOR
BY Victor J. Evans & Co.
ATTORNEY Patented Mar. 24, 1936

2,035,342

UNITED STATES PATENT OFFICE 2,035,342

TAILOR'S APPLIANCE

Charles E. Reed, Lexington, Mo.

Application November 12, 1934, Serial No. 752,749

1 Claim. (Cl. 33—7)

This invention relates to tailor's measuring devices and the object is to provide a simple inexpensive device, complete in itself, by the use of which peculiarities of figure will be accurately noted. A device embodying the invention is illustrated in the accompanying drawing and will be hereinafter fully described, the novel features being particularly defined in the appended claim.

In the drawing:

Figure 1 is a perspective view of the device illustrating one manner of using it.

Figure 2 is an elevation of the device on a larger scale.

Figure 3 is a top plan view of the device.

Figure 4 is an edge elevation.

Figure 5 is an enlarged section on the line 5—5 of Figure 2.

The device consists of an integral U-shaped frame 1 which may be of any suitable material and has side arms 2, 3, each of which has a concave outer edge, the arm 3 having its lower end portion expanded over the sides of the frame or body, as at 4. A scale in inches is displayed on each side face of the thickened portion, as shown at 5, and alongside the scale is the legend "Neck", indicating that the scale is for measuring the length of the customer's neck. Similar legends are shown on the side arms or members and adjacent the lower edge of the body or frame. An arcute slot or sight opening 6 is formed in the body or frame and a bubble tube 7 is mounted in said slot, correspondingly slotted guard plates 8 are secured to the body at the slot 6 to guard the bubble tube against contact with extraneous objects and possible resulting breakage. On each guard plate is a scale 9 in inches. The lower edge of the body or frame is convex.

When the device is placed squarely against the body member which is to be described, the bubble will come to rest at such point of the scale 9 as will tell to a fraction of an inch just how much the most prominent point on the member is away from a vertical or horizontal line. This variation is called indentation. In Figure 1, the device is shown measuring just how much the most prominent part of the shoulder blades varies from the plumb or level line, and it is suggested that the formation of the blades does not permit the device to be placed squarely against the back, in which event, a thin metal strip 10 is placed across the most prominent part of the blades and the tool is then applied straight down the back with its lower edge resting on the metal strip. The edges of the device are shaped to fit squarely against different members of the body and the legends adjacent the respective edges identify the body members to which they are to be applied. If the wrong edge be applied in any instance, the bubble will not show. If the bottom convex edge of the device be placed on the shoulder, the position of the bubble will show how much the shoulder slopes. If the device be set at the nape of the neck with the edge marked "Head Forward" resting against the back of the head, the bubble will tell how much the head is forward. If the bubble does not show, the device should be reversed and the bubble will then show how much the head is erect or back.

The device is very simple and is free of mystifying phrases and large numbers of degree marks. The bubble or indicator is without friction and there is perfect performance at all times without the measure-taker being required to make any deductions.

Having described my invention, what I claim is:

A tailor's appliance consisting of a body having a convex lower edge and provided with an arcuate slot, arms extending from the upper edge of the body and having concave outer edges, a bubble tube mounted in the slot in the body, and guard plates secured on the body at said slot and having slots through which the tube may be viewed, said plates having scales displayed thereon.

CHARLES E. REED.